United States Patent
Mann et al.

(10) Patent No.: US 9,784,231 B2
(45) Date of Patent: Oct. 10, 2017

(54) SYSTEM AND METHOD FOR DETERMINING KNOCK MARGIN FOR MULTI-CYLINDER ENGINES

(71) Applicant: General Electric Company, Schenectady, NY (US)

(72) Inventors: Scott K. Mann, Jefferson, WI (US); Jared J. Wentz, Waukesha, WI (US); Jeffrey Jacob Bizub, Milwaukee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 127 days.

(21) Appl. No.: 14/705,081

(22) Filed: May 6, 2015

(65) Prior Publication Data

US 2016/0327010 A1 Nov. 10, 2016

(51) Int. Cl.
*F02D 41/14* (2006.01)
*F02D 41/26* (2006.01)
(Continued)

(52) U.S. Cl.
CPC ............ *F02P 5/152* (2013.01); *F02D 35/027* (2013.01); *F02D 37/02* (2013.01);
(Continued)

(58) Field of Classification Search
CPC ............ F02D 41/1454; F02D 41/1475; F02D 2200/1015; F02D 35/0015; F02D 35/027;
(Continued)

(56) References Cited

U.S. PATENT DOCUMENTS 4,419,974 A * 12/1983 Nagase .................. F02P 5/152
123/406.55
4,535,739 A * 8/1985 Kudo .................... F02D 35/027
123/406.35
(Continued)

FOREIGN PATENT DOCUMENTS

CN 203480037 3/2014
DE EP 2743482 A1 * 6/2014 .............. F02P 5/152
(Continued)

OTHER PUBLICATIONS

International Search Report and Written Opinion issued in connection with corresponding PCT Application No. PCT/US2016/030624, dated Sep. 13, 2016.
(Continued)

*Primary Examiner* — Lindsay Low
*Assistant Examiner* — George Jin
(74) *Attorney, Agent, or Firm* — Fletcher Yoder, P.C.

(57) ABSTRACT

A method includes receiving a signal indicative of a change in an air-fuel ratio (AFR) for a mixture of air and fuel entering a first combustion chamber of a combustion engine, advancing firing timing of the first combustion chamber, receiving, from a knock sensor, a knock signal indicating that the combustion engine has begun to knock, determining a knock margin of the first combustion chamber based on when the combustion engine begins to knock, and storing the knock margin as associated with the knock timing and the AFR.

17 Claims, 3 Drawing Sheets

(51) Int. Cl.
*F02P 5/152* (2006.01)
*F02D 35/02* (2006.01)
*F02D 37/02* (2006.01)

(52) U.S. Cl.
CPC ..... *F02D 41/1454* (2013.01); *F02D 41/1498* (2013.01); *F02D 41/263* (2013.01); *F02P 5/1522* (2013.01); *F02P 5/1523* (2013.01)

(58) Field of Classification Search
CPC ....... F02D 35/028; F02P 5/1522; F02P 5/152; F02P 5/02; F02P 5/04; F02P 5/045; F02P 5/145
USPC .......................................... 73/116.05, 114.16
See application file for complete search history.

(56) References Cited

U.S. PATENT DOCUMENTS

| | | | |
|---|---|---|---|
| 4,716,873 A * | 1/1988 | Takaba | F02D 37/02 123/406.34 |
| 5,029,565 A | 7/1991 | Talbot | |
| 5,109,821 A * | 5/1992 | Yoshida | F02D 41/0025 123/406.15 |
| 5,111,790 A | 5/1992 | Grandy | |
| 5,115,778 A | 5/1992 | Holroyd | |
| 5,119,783 A | 6/1992 | Komurasski | |
| 5,241,480 A | 8/1993 | Takaku et al. | |
| 5,257,533 A | 11/1993 | Imada | |
| 5,267,164 A * | 11/1993 | Miyama | F02P 5/152 123/406.33 |
| 5,337,240 A | 8/1994 | Nakagawa et al. | |
| 5,339,245 A | 8/1994 | Hirata et al. | |
| 5,361,213 A | 11/1994 | Fujieda et al. | |
| 5,392,642 A | 2/1995 | Tao | |
| 5,400,648 A | 3/1995 | Mahr | |
| 5,452,699 A | 9/1995 | Rossignol | |
| 5,467,638 A | 11/1995 | Philipp | |
| 5,594,649 A | 1/1997 | Cook et al. | |
| 5,610,819 A | 3/1997 | Mann et al. | |
| 5,693,936 A | 12/1997 | Komachiya et al. | |
| 5,763,769 A | 6/1998 | Kluzner | |
| 5,771,862 A * | 6/1998 | Unland | F02P 5/1521 123/406.33 |
| 5,837,887 A | 11/1998 | Shibata et al. | |
| 5,905,193 A | 5/1999 | Hashizume et al. | |
| 5,932,801 A | 8/1999 | Akishita et al. | |
| 5,934,256 A | 8/1999 | Wenzlawski et al. | |
| 5,996,398 A | 12/1999 | Schleupen et al. | |
| 6,104,195 A | 8/2000 | Yoshinaga et al. | |
| 6,273,064 B1 | 8/2001 | Scholl et al. | |
| 6,276,334 B1 | 8/2001 | Flynn et al. | |
| 6,330,877 B1 | 12/2001 | Nordin | |
| 6,336,355 B1 | 1/2002 | Sasaki et al. | |
| 6,550,311 B2 | 4/2003 | Sloboda | |
| 6,598,468 B2 | 7/2003 | Zur Loye et al. | |
| 6,662,781 B1 | 12/2003 | Torno et al. | |
| 6,814,054 B2 | 11/2004 | Sauler et al. | |
| 6,862,517 B2 | 3/2005 | Galtier | |
| 6,885,932 B2 | 4/2005 | Liu et al. | |
| 6,912,460 B2 | 6/2005 | Sauler et al. | |
| 6,947,829 B2 | 9/2005 | Honda | |
| 6,978,771 B2 | 12/2005 | Kuzuyama et al. | |
| 6,990,947 B2 | 1/2006 | Kuzuyama et al. | |
| 7,021,128 B2 | 4/2006 | Rauchfuss et al. | |
| 7,027,909 B2 | 4/2006 | deBotton et al. | |
| 7,181,338 B2 | 2/2007 | Takemura et al. | |
| 7,191,658 B2 | 3/2007 | Oda et al. | |
| 7,212,909 B2 | 5/2007 | Yoshino et al. | |
| 7,243,529 B2 | 7/2007 | Takemura et al. | |
| 7,246,600 B2 | 7/2007 | Nakashima et al. | |
| 7,260,469 B2 | 8/2007 | Birk et al. | |
| 7,263,872 B2 | 9/2007 | Danet et al. | |
| 7,310,993 B2 | 12/2007 | Popielas et al. | |
| 7,325,529 B2 | 2/2008 | Ancimer et al. | |
| 7,356,404 B2 | 4/2008 | Takemura et al. | |
| 7,376,506 B2 | 5/2008 | Schueler | |
| 7,383,816 B2 * | 6/2008 | Zurlo | F02D 41/0025 123/406.3 |
| 7,444,231 B2 | 10/2008 | Ancimer et al. | |
| 7,444,236 B2 | 10/2008 | Wiles | |
| 7,448,254 B2 | 11/2008 | Kurtz et al. | |
| 7,546,198 B2 | 6/2009 | Remelman | |
| 7,559,230 B2 | 7/2009 | Zimmer | |
| 7,571,640 B2 | 8/2009 | Andrews | |
| 7,628,253 B2 | 12/2009 | Jin et al. | |
| 7,669,582 B2 | 3/2010 | Kaneko et al. | |
| 7,685,995 B2 * | 3/2010 | Nonoyama | F02D 19/081 123/406.31 |
| 7,712,450 B2 | 5/2010 | Sato et al. | |
| 7,747,380 B2 | 6/2010 | Chauvin et al. | |
| 7,810,469 B2 | 10/2010 | Vigild et al. | |
| 7,823,561 B2 | 11/2010 | Omuro et al. | |
| 8,000,884 B2 | 8/2011 | Aso et al. | |
| 8,032,293 B2 | 10/2011 | Binder et al. | |
| 8,068,972 B2 | 11/2011 | Auclair et al. | |
| 8,078,389 B2 | 12/2011 | Huang et al. | |
| 8,079,261 B2 | 12/2011 | Crickmore et al. | |
| 8,108,131 B2 | 1/2012 | Huang et al. | |
| 8,155,857 B2 | 4/2012 | Loeffler et al. | |
| 8,250,905 B2 | 8/2012 | Schneider et al. | |
| 8,260,531 B2 | 9/2012 | Yasuda | |
| 8,316,824 B2 | 11/2012 | Hagari et al. | |
| 8,342,011 B2 | 1/2013 | Galtier et al. | |
| 8,359,909 B2 | 1/2013 | Duval et al. | |
| 8,396,649 B2 | 3/2013 | Huang | |
| 8,463,533 B2 | 6/2013 | Glugla et al. | |
| 8,499,623 B2 | 8/2013 | Duval et al. | |
| 8,528,521 B2 | 9/2013 | Landsmann et al. | |
| 8,538,666 B2 | 9/2013 | Buslepp et al. | |
| 8,606,484 B2 | 12/2013 | Ohata | |
| 8,627,800 B2 | 1/2014 | Glugla et al. | |
| 8,639,432 B2 | 1/2014 | Matsuo et al. | |
| 8,677,975 B2 | 3/2014 | Auclair et al. | |
| 8,680,707 B2 | 3/2014 | Childs et al. | |
| 8,812,310 B2 | 8/2014 | Muhammad et al. | |
| 8,849,471 B2 | 9/2014 | Daniel et al. | |
| 2007/0277780 A1 * | 12/2007 | Akazaki | F02D 35/028 123/406.22 |
| 2010/0326399 A1 * | 12/2010 | Pendray | F01B 1/12 123/25 J |
| 2012/0048234 A1 * | 3/2012 | Hamama | F02D 41/0025 123/436 |
| 2013/0006505 A1 | 1/2013 | Shinagawa et al. | |

FOREIGN PATENT DOCUMENTS

| | | |
|---|---|---|
| EP | 1447654 | 8/2004 |
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| EP | 2743482 A1 | 6/2014 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

U.S. Appl. No. 14/745,986, filed Jun. 22, 2015, Sandro Rivellini.
U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.

(56) References Cited

OTHER PUBLICATIONS

U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jerry Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2015, Jeffrey Jacob Bizub.
Reduction Piston Slap Excitation by Optimizing Piston Profiles; Takayuki Koizumi et al.; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.
Bolt loosening detection using vibration characteristics of thin plate with piezoelectric elements; Takeshi Nakahara et al; Proc.of SPIE 5391, Smart Struc. & Materials, Jul. 2004.

\* cited by examiner

SYSTEM AND METHOD FOR DETERMINING KNOCK MARGIN FOR MULTI-CYLINDER ENGINES

BACKGROUND

The subject matter disclosed herein relates to knock sensors, and more specifically, to utilizing knock sensors mounted to large, multi-cylinder reciprocating devices (e.g., combustion engine, compressors, etc.) in conjunction with standard quality control techniques to improve knock margin detection and efficiency of the firing timing of the reciprocating devices.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power. During use, combustion engines may experience various noises, mechanical faults, or changes in conditions that may be difficult to detect and/or predict.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a method includes receiving a signal indicative of a change in an air-fuel ratio (AFR) for a mixture of air and fuel entering a first combustion chamber of a combustion engine, advancing firing timing of the first combustion chamber, receiving, from a knock sensor, a knock signal indicating that the combustion engine has begun to knock, determining a knock margin of the first combustion chamber based on when the combustion engine begins to knock, and storing the knock margin as associated with the knock timing and the AFR.

In accordance with a second embodiment, a method includes receiving a signal indicative of an air-fuel ratio (AFR) for a fuel entering a first combustion chamber of a combustion engine, advancing firing timing of a first combustion chamber at a first advancing rate from an operating timing to a predetermined safe timing, advancing firing timing of the first combustion chamber at a second advancing rate from the safe timing, wherein the second advancing rate is slower than the first advancing rate, receiving, from a knock sensor, a knock signal indicating that the combustion engine has begun to knock, determining a knock margin of the first combustion chamber based on when the combustion engine begins to knock, storing the knock margin as associated with the knock timing and the AFR.

In accordance with a third embodiment, a system includes a controller programmed to receive a signal indicative of a change in an air-fuel ratio (AFR) for a mixture of air and fuel entering a first combustion chamber of a combustion engine, advance firing timing of the first combustion chamber, receive, from a knock sensor, a knock signal indicating that the combustion engine has begun to knock, determine a knock margin of the first combustion chamber based on when the combustion engine begins to knock, and store the knock margin as a relationship between knock timing and the AFR.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

During use, combustion engines (or other reciprocating devices such as reciprocating compressors) operate at a firing timing wherein the reciprocating components of the engine complete a cycle in a given time. The firing timing may be affected by a number of conditions within the engine, and in turn the firing timing may affect the power output of the engine. Generally, reciprocating engines are able to produce higher torque and thus more power when the rotational speed is faster. Thus, a higher firing timing generally is desirable. Unfortunately, a high firing timing may result in engine conditions that are undesirable. For example, a high firing timing may result in engine knock, which can contribute to wearing in the engine and/or decrease in efficiency of the engine. Firing timing may be chosen to prevent engine knock, but several factors may contribute to the specific firing timing at which knock will occur. As described in further detail below, systems and methods are provided for determining a knock margin whenever a change in air-fuel ratio creates a potential for a change in the firing timing that may cause engine knock.

Figure 1:
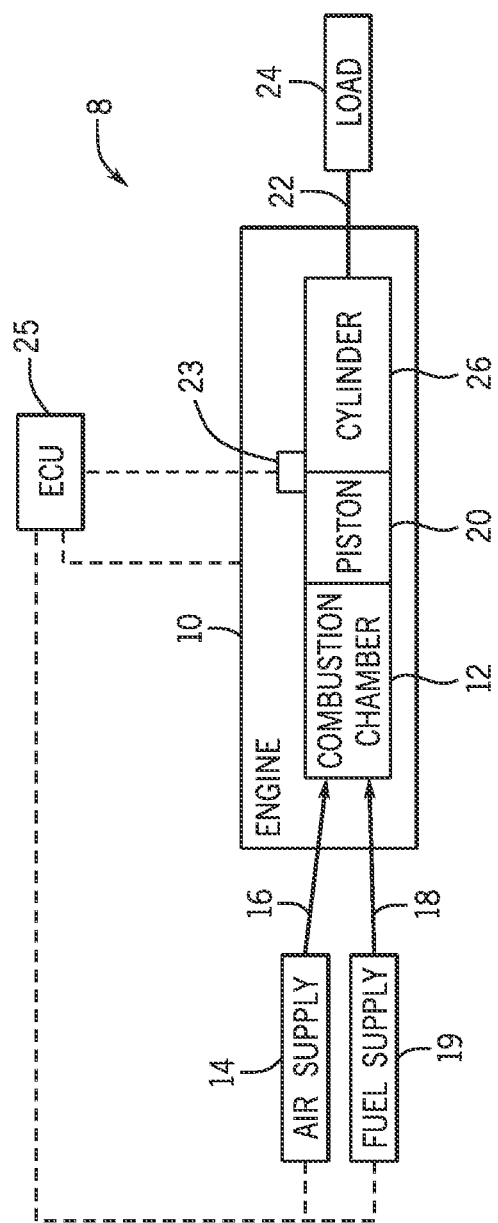
FIG. 1 is a block diagram of an embodiment of a portion of an engine driven power generation system in accordance with aspects of the present disclosure.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and an air-fuel mixture ignites and combusts within each combustion chamber 12. The air-fuel mixture mixes at an air-fuel ratio (AFR) that may depend on the composition of the fuel and/or other environmental conditions. The AFR is the mass ratio of air to fuel. For example, fuel of a first type may mix with the pressurized oxidant 16 at a first AFR due to having a first temperature, composition, viscosity, octane, etc. On the other hand, a second fuel type may mix at a different AFR due to having different temperature, composition, viscosity, octane, etc. The air-fuel mixture combusts within the combustion chamber 12 and the hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The engine driven power generation system 8 may include one or more knock sensors 23 suitable for detecting engine "knock." The knock sensor 23 may sense vibrations caused by the engine, such as vibration due to detonation, pre-ignition, and or pinging. In addition, the engine driven power generation system may include other sensors 27 (e.g., one or more temperature transducers) to detect other operating conditions (e.g., temperature (e.g., global temperature and/or temperature gradient) of a medium (e.g., cast iron) that the one or more knock sensors 23 are coupled to). The knock sensor 23 is shown communicatively coupled to an engine control unit (ECU) 25. During operations, signals from the knock sensor 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust boost pressure to eliminate the knocking. As further described herein, the ECU 25 may receive signals from the air supply 14 and/or the fuel supply 19 that are indicative of an AFR or an equivalence ratio or lambda ($\lambda$) (i.e., ratio of actual AFR to stoichiometric AFR). In certain embodiments, sensors within the cylinder 26 may directly detect an amount of air 16 and/or fuel 18 that is injected into the cavity 30 of the cylinder 26 to determine the AFR/$\lambda$. The ECU 25 may use the AFR or $\lambda$ in combination with signals from the knock sensor 23 to determine a knock margin at which the engine 10 may operate without knocking. Although the following techniques are discussed in terms of a combustion engine, the same techniques may be applied to other reciprocating devices such as compressors.

Figure 2:
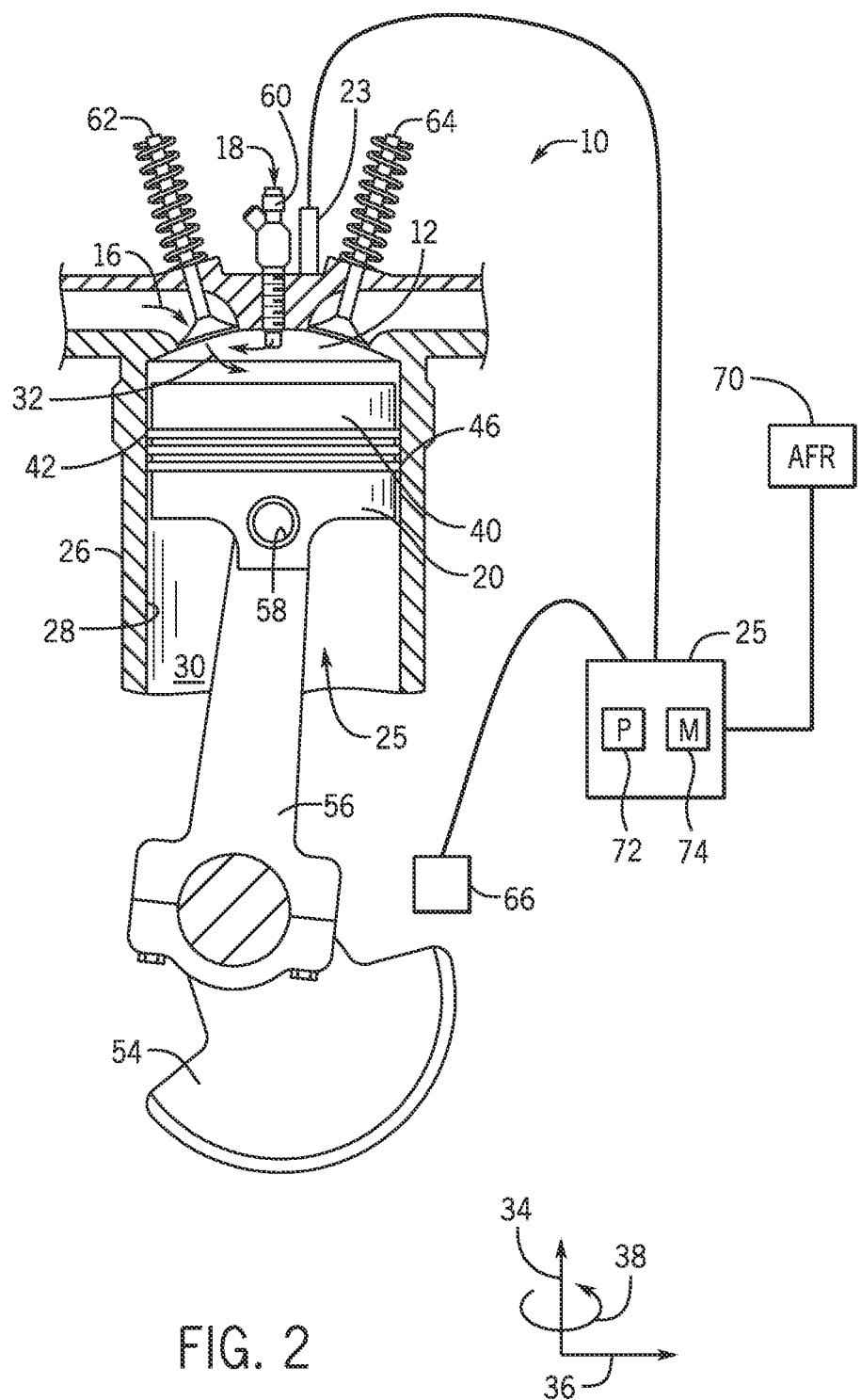
FIG. 2 is a side cross-sectional view of an embodiment of a piston assembly within a cylinder of the reciprocating engine shown in FIG. 1 in accordance with aspects of the present disclosure.

FIG. 2 is a side cross-sectional view of an embodiment of a piston assembly 25 having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a air-fuel mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process typically occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed air-fuel mixture, which may include a spark ignition through a spark plug system, and/or a compression ignition through compression heat. The resulting pressure from combustion then forces the piston 20 to BDC. The exhaust process typically returns the piston 20 to TDC while keeping the exhaust valve 64 open. Under certain conditions, the air-fuel mixture 32 may combust prematurely before the piston 20 returns to TDC, or after the piston 20 has passed TDC. These conditions may be called "knock" or "pinging" and may be detected by the knock sensor 23. The knock may be affected by many conditions including environmental conditions, engine health, load on the engine 10, air flow, fuel flow, or composition of the fuel. As a specific example, a change from one fuel source to another fuel source may include a change in fuel composition and an accompanying change in the AFR of the air-fuel mixture 32. After combustion, the exhaust process concludes by expelling the spent air-fuel mixture through the exhaust valve 64. It is to be noted that more than one intake valve 62 and exhaust valve 64 may be used per cylinder 26.

The depicted engine 10 also includes a crankshaft sensor 66, the knock sensor 23, and the ECU 25, which includes a processor 72 and memory 74. The processor 72 may include one or more "general-purpose" microprocessors, one or more special-purpose microprocessors, and/or one or more application specific integrated circuits (ASICS), system-on-chip (SoC) device, or some other processor configuration. For example, the processor 72 may include one or more reduced instruction set (RISC) processors or complex instruction set (CISC) processors. The processor 72 may execute instructions to carry out the operation of the engine 10. These instructions may be encoded in programs, or code stored in a tangible non-transitory computer-readable medium (e.g., an optical disc, solid state device, chip, firmware, etc.) such as the memory 74. In certain embodiments, the memory 74 may be wholly or partially removable from the ECU 25. The memory 74 may store a number of operating parameters that may be used by the ECU 25 to adjust the operation of the engine 10. The crankshaft sensor 66 senses the position and/or rotational speed of the crankshaft 54. Accordingly, a crank angle or crank timing information may be derived. That is, when monitoring combustion engines, timing is frequently expressed in terms of crankshaft 54 angle. For example, a full cycle of a four stroke engine 10 may be measured as a 720° cycle. The ECU 25 is thus able to track the timing of the combustion event within the cylinder 26 for determining specifically when knock occurs. The knock sensor 23 may be a Piezo-electric accelerometer, a microelectromechanical system (MEMS) sensor, a Hall effect sensor, a magnetorestrictive sensor, and/or any other sensor designed to sense vibration, acceleration, sound, and/or movement. In other embodiments, sensor 23 may not be a knock sensor, but any sensor that may sense vibration, pressure, acceleration, deflection, or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder 26 may include one or more knock sensors 23 (e.g., one or more arrays of knock sensors 23 arranged along one or more planes through the engine 10). The crankshaft sensor 66 and the knock sensor 23 are shown in electronic communication with the engine control unit (ECU) 25.

A sensor 70 (e.g., AFR sensor) is also coupled to the ECU 25. The sensor 70, in certain embodiments, may include sensors within the cylinder 26 that directly detect an amount of air 16 and/or fuel 18 that is injected into the cavity 30 of the cylinder 26. More generally, the AFR sensors 70 may include sensors that detect conditions that may be used to estimate the AFR or $\lambda$. For example, without measuring the specific AFR or $\lambda$ within the cavity 30, the sensors 70 may detect the temperature and pressure of the air 16 at intake, or may measure the flow rates of the air and fuel separately to estimate the AFR or $\lambda$. Furthermore, sensors 70 in the exhaust of the engine may measure oxygen, for example, which may indicate an accurate estimation of the AFR or $\lambda$ of the air-fuel mixture 32. To receive and process the signals from the sensors 23, 66, 70, the ECU 25 includes the processor 72 and the memory 74 (e.g., a machine-readable medium). The memory 74 may store non-transitory code or computer instructions that may be executed by the processor 72. The ECU 25 monitors and controls and operation of the engine 10, for example, by adjusting combustion timing, valve 62, 64, timing, adjusting the delivery of fuel and oxidant (e.g., air), and so on.

Figure 3:
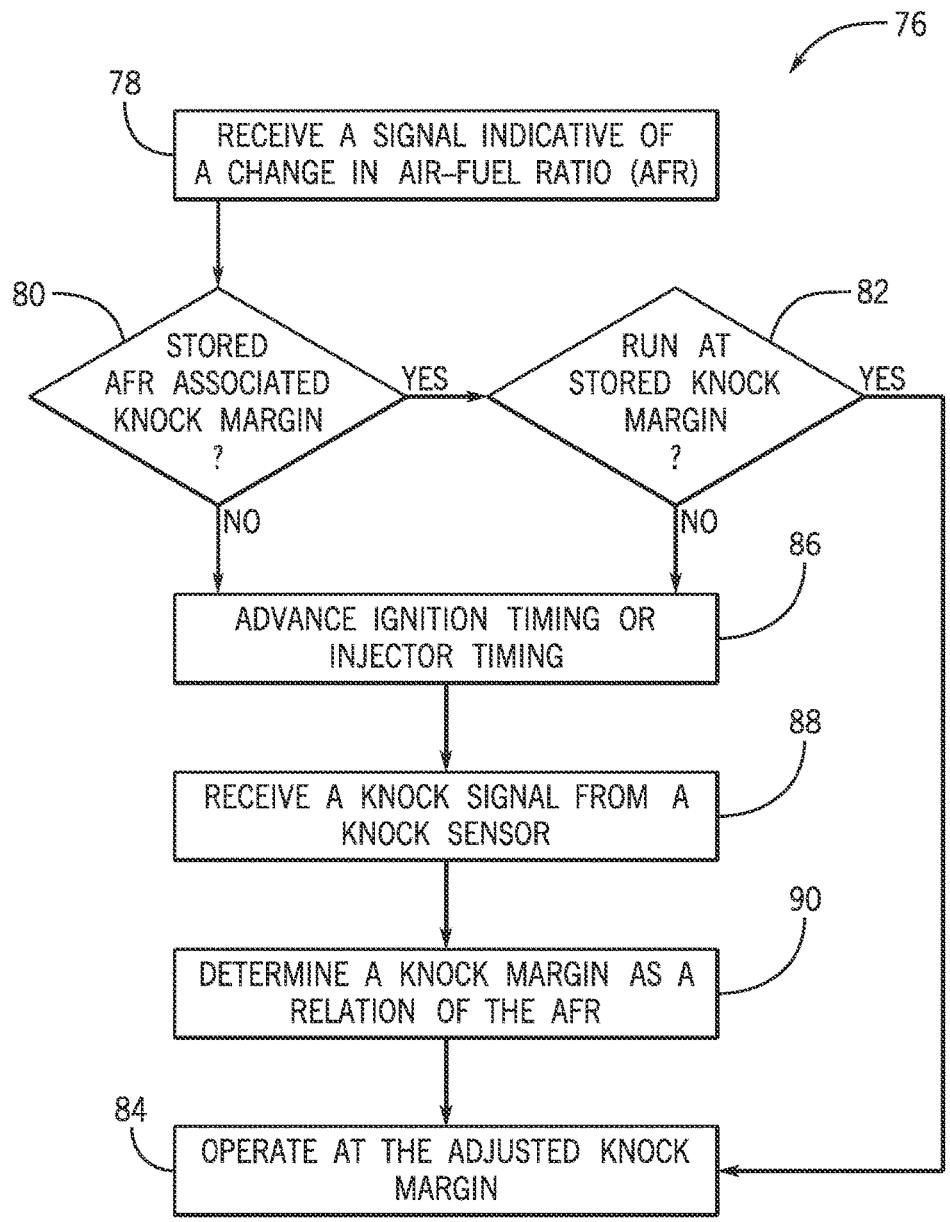
FIG. 3 is a flow chart illustrating an embodiment of a process for adjusting operation of the engine based on a change in air-fuel ratio of the incoming fuel.

FIG. 3 is a flow chart illustrating an embodiment of a process 76 for determining and storing a knock margin for the engine 10. The process 76 may be used while the engine 10 is operating and begins when the ECU 25 receives 78 a signal indicative of a change in the AFR or $\lambda$. As mentioned above, the signal may be sent from the AFR sensors 70. The signal may be triggered by direct detection of the air-fuel mixture, or may be triggered by detection of a change in a temperature of the air, a pressure of the air, a flow of the air, a flow of the fuel, an oxygen level of an exhaust gas, or any combination thereof. Furthermore, the signal may be triggered by user input, for example when a user knows that the fuel source changes from one source to another of a different composition. In some embodiments, the ECU 25 may include stored knock margins as a relationship of AFR or $\lambda$. Thus, when a change in the AFR or $\lambda$ is received, the ECU 25 may determine whether a knock margin has previously been determined for that AFR or $\lambda$ (block 80). If the AFR or $\lambda$ knock margin has been stored, then the ECU 25 may ask for a user input as to whether to run at the stored knock margin or to determine a new knock margin (block 82). If a user indicates that the engine 10 is to run at the stored knock margin, then the engine 10 operates at the new knock margin (block 84). Alternatively, in certain embodiments the ECU 25 may not ask whether or not to run at the stored knock margin, but instead, if there is a stored knock margin for the detected AFR or λ, then the engine may operate under that knock margin.

To determine a new knock margin for the detected AFR or λ, the ECU 25 may advance the firing timing of the engine 10 (block 86). The advance of the firing timing may vary in speed. That is, the firing timing may advance quickly at first until a predetermined firing timing is reached, and then the advance may slow down. The predetermined firing timing may be based, for example, on former safe timing for the previous AFR or λ. The firing timing is advanced until the knock sensor 23 detects that the engine is knocking and sends a signal to the ECU 25 (block 88). The knock sensor 23 also detects a severity of knock and relays this to the ECU 25. The ECU 25 then determines a knock margin based on the firing timing at which knock started to occur, and the severity at which the knock occurs (block 90). For example, if the knock occurs at a specific timing but immediately experiences heavy knocking, the response would be different than if the knock was only slight when the knock began. Once the knock margin is determined, then the engine 10 may operate at the new knock margin (block 84). Operating at the new knock margin includes operating at a firing timing that does not cause knocking within the engine 10.

Technical effects of the disclosed embodiments include a reciprocating engine 10 or other reciprocating device (e.g., reciprocating compressor) that operates under the control of an engine control unit (e.g., ECU 25). The ECU 25 receives signals from knock sensors 23, crankshaft sensors 66 and AFR sensors 70 to monitor and control the engine 10 through changes in the knock margin caused by varying the AFR or λ. For example, when a fuel source changes, the AFR or λ may change and affect the knock margin. The ECU 25 is configured to respond to these changes so that the engine 10 performs at or near the highest possible firing timing, without experiencing engine knock.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
receiving, at a controller, a signal indicative of a change in an air-fuel ratio (AFR) for a mixture of air and fuel entering a first combustion chamber of a combustion engine;
advancing firing timing of the first combustion chamber via the controller, in response to the change in the AFR until the combustion engine begins to knock;
receiving, at the controller, from a knock sensor, a knock signal indicating that the combustion engine has begun to knock;
determining, via the controller, a first knock margin of the first combustion chamber based on when the combustion engine begins to knock;
storing the first knock margin as associated with the knock timing and the AFR; and
when the knock signal is received, determining whether the AFR has been previously stored, and:
if the AFR has been previously stored, operating under the previously stored AFR associated knock margin, or
if the AFR has not been stored, determining a second knock margin for the first combustion chamber.

2. The method of claim 1, comprising advancing, via the controller, a firing timing of a second combustion chamber until the combustion engine begins to knock to determine a second knock margin of the second combustion chamber.

3. The method of claim 2, wherein advancing firing timing of the first combustion chamber is different from the second combustion chamber.

4. The method of claim 1, comprising comparing the first knock margin to a previously stored knock margin and determining an operating parameter based on the difference between the first knock margin and the previously stored knock margin.

5. The method of claim 4, wherein determining the operating parameter comprises determining a wear factor for a component of the combustion engine.

6. The method of claim 1, wherein determining the first knock margin of the first combustion chamber is based on severity of the knock signal.

7. A method, comprising:
receiving, at a controller, a first signal indicative of a first change in an air-fuel ratio (AFR) for a fuel entering a first combustion chamber of a combustion engine;
advancing, at the controller, firing timing of a first combustion chamber at a first advancing rate from an operating timing to a predetermined safe timing in response to the first change in the AFR;
advancing, at the controller, firing timing of the first combustion chamber at a second advancing rate from the predetermined safe timing, wherein the second advancing rate is slower than the first advancing rate until the combustion engine begins to knock;
receiving, at the controller, a first knock signal from a knock sensor indicating that the combustion engine has begun to knock;
determining, at the controller, a first knock margin of the first combustion chamber based on when the combustion engine begins to knock;
storing the first knock margin as associated with the knock timing and the AFR; and
when the first knock signal is received, determining whether the AFR has been previously stored, and:
if the AFR has been previously stored, operating under the previously stored AFR associated knock margin, or
if the AFR has not been stored, determining a second knock margin for the first combustion chamber.

8. The method of claim 7, comprising receiving, at the controller, a second signal indicative of a second change in the AFR and determining a second knock margin for the first combustion chamber.

9. The method of claim 7, wherein if the AFR has been stored, asking for user feedback for whether to run at the stored AFR knock margin.

10. The method of claim 7, wherein if the AFR has been stored within the last week, operating at the stored AFR associated knock margin and if the AFR has been stored longer than a week, requesting user feedback as to whether to operate the combustion engine at the stored AFR associated knock margin.

11. The method of claim 7, comprising comparing the first knock margin to the previously stored knock margin and determining an operating parameter based on the difference between the first knock margin and the previously stored knock margin.

12. The method of claim 11, wherein determining the operating parameter comprises determining a wear factor for a component of the combustion engine.

13. The method of claim 7, wherein determining the first knock margin of the first combustion chamber is based on severity of the knock signal.

14. A system, comprising:
a controller programmed to receive a signal indicative of a change in an air-fuel ratio (AFR) for a mixture of air and fuel entering a first combustion chamber of a combustion engine, to advance firing timing of the first combustion chamber in response to the change in the AFR until the combustion engine begins to knock, to receive, from a knock sensor, a knock signal indicating that the combustion engine has begun to knock, determine a knock margin of the first combustion chamber based on when the combustion engine begins to knock, and to store the knock margin as a relationship between knock timing and the AFR, and wherein the controller is programmed, when the knock signal is received, to determine whether the AFR has been previously stored, and if the AFR has been previously stored, to cause the combustion engine to operate under the previously stored AFR associated knock margin, or if the AFR has not been stored, to determine a second knock margin for the first combustion chamber.

15. The system of claim 14, comprising a crankshaft sensor configured to send a signal indicative of crank angle for determining accurate firing timing for the first combustion chamber.

16. The system of claim 14, wherein the controller is configured to store knock margins as associated with knock timing and the detected AFR.

17. The system of claim 16, wherein the controller is configured to store how long the stored knock margin has been stored.

* * * * *